US005493953A

United States Patent [19]

Bolthouse et al.

[11] Patent Number: 5,493,953

[45] Date of Patent: Feb. 27, 1996

[54] CYLINDER AND PISTON FOR COMPRESSOR OR VACUUM PUMP

[75] Inventors: John H. Bolthouse; M. Wayne Meece, both of Monroe, La.

[73] Assignee: Thomas Industries Inc., Monroe, La.

[21] Appl. No.: 339,048

[22] Filed: Nov. 14, 1994

[51] Int. Cl.$^{6}$ .......... F16J 15/18

[52] U.S. Cl. .......... 92/165 R; 92/DIG. 1; 74/44; 384/11

[58] Field of Search .......... 92/165 R, DIG. 1, 92/139; 384/11; 74/44; 417/562, 486, 487

[56] References Cited

U.S. PATENT DOCUMENTS

| | | | |
|---|---|---|---|
| 1,052,521 | 2/1913 | Scott | 74/44 |
| 1,405,403 | 2/1922 | Everett | 74/44 |
| 2,049,570 | 8/1936 | Schoene | 74/44 |
| 2,057,158 | 10/1936 | Moffitt | 92/139 |
| 3,367,276 | 2/1968 | Hatsuta | 92/165 |
| 3,656,414 | 4/1972 | Muller | 92/249 |
| 3,906,923 | 9/1975 | Harker | 92/212 |
| 4,669,369 | 6/1987 | Holt et al. | 92/160 |

OTHER PUBLICATIONS

Applicant's Exhibit 1, drawing of Pneumotive Division, Thomas Industries, Inc. dated Jul. 19, 1994 entitled "Present Design 2 Stage Oiless Compressor," admitted prior art.

*Primary Examiner*—Thomas E. Denion
*Attorney, Agent, or Firm*—Quarles & Brady

[57] ABSTRACT

A cylinder and piston construction for a compressor or vacuum pump has a cylinder defined by co-axial cylinder and guideway sleeves. The guideway sleeve is larger in diameter than the cylinder sleeve and the cylinder sleeve extends axially into the guideway sleeve. A piston has a cylindrical base which is guided via skirt bearings in the guideway and a head which extends from the base into the compression chamber defined by the cylinder sleeve and has a piston ring which forms a sliding seal with the cylinder sleeve. An annular cavity is defined between the piston head and the piston base into which the cylinder sleeve extends so that the top skirt bearing is positioned closer to the top of the piston head and further away from the bottom skirt bearing so as to steadily guide the piston head in the cylinder sleeve, thereby reducing wear and increasing the life of the pump.

16 Claims, 1 Drawing Sheet

CYLINDER AND PISTON FOR COMPRESSOR OR VACUUM PUMP

BACKGROUND OF THE INVENTION

1. Field of the Invention

This invention relates to cylinder and piston constructions for compressors or vacuum pumps, and in particular for oilless compressors or vacuum pumps.

2. Discussion of the Prior Art

Reciprocating piston type compressors and vacuum pumps are of course well known. In such compressors and vacuum pumps, a piston is reciprocated in a cylinder to compress a gas in a compressor or draw a vacuum in a vacuum pump. Since the outer surfaces of the piston slide against the inner surfaces of the cylinder, wear inevitably occurs.

Such wear has an adverse effect on the efficiency of the pump and may even result in damage to the pump. For example, the piston usually has a sealing ring which forms a sliding seal with the walls of the compression chamber. As wear occurs, the integrity of the seal diminishes such that the pressure which was once attainable in the compression chamber no longer can be reached. This is particularly a problem for higher pressure compressors and vacuum pumps, since in such compressors and vacuum pumps the sealing ring is called upon to maintain a higher pressure differential across it.

However, even in low pressure pumps, the seal can be adversely affected by wear to the extent that the pump is no longer effective. In extremely aggravated cases, the wear between the piston and cylinder may become so severe that the piston becomes skewed in the cylinder and may actually impact against parts of the pump such as the valve plate which closely overlies the piston when the piston is at its top dead center position.

Where the application allows it, wear between the piston and cylinder can be materially reduced by the use of a liquid or powder lubricant, hereinafter referred to as a free lubricant, between the sliding surfaces of the piston and cylinder. However, in some applications such as medical and food related applications, the use of free lubricants is not allowed, since even small traces of the lubricant in the pumped gas are undesirable. For example, in Europe it is common for a pub to charge its beer kegs with nitrogen which is pumped to a relatively high pressure. In these applications, an oilless compressor or vacuum pump may be employed, in which no free lubricants are used on the sliding surfaces between the piston and the cylinder, but lubricious materials are employed on those surfaces in an attempt to lessen the wear therebetween.

SUMMARY OF THE INVENTION

The present invention provides a construction of a cylinder and piston for a compressor or vacuum pump which reduces the wear between the sliding surfaces thereof so as to increase the life of the pump. A compressor or vacuum pump of the invention has a housing which defines a compression chamber and a guideway co-axial with the compression chamber, and a piston which is reciprocable in the housing. The piston has a head which is received in the compression chamber to compress a gas therein when the piston is reciprocated and a base received in the guideway to guide the head as the piston is reciprocated. In accordance with the invention, the compression chamber is defined by a cylinder sleeve in which the head of the piston reciprocates. The cylinder sleeve has a bottom end which extends axially into the guideway and the base of the piston has a top surface facing the cylinder sleeve which defines an axially facing cavity radially inward of a top end of the base of the piston. The sleeve extends into the cavity when the piston is at a top dead center position.

With this construction, the base of the piston is guided nearer to the top of the piston head, and therefore to the location of the piston ring, where wear can be the most damaging. In addition, this construction results in an axially longer effective guiding area so that the piston is more stably guided in the housing.

In a preferred form, a skirt is provided on the base adjacent to the top end of the base and provides a bearing surface that slides against the guideway. A bottom-end skirt is also preferably provided axially spaced as far as possible away from the top-end skirt. By axially positioning the top skirt close to the piston ring and the bottom skirt far away from the bottom skirt, the most stability practical is provided for guiding the piston as it reciprocates. In particular, the radial loading on the skirts is reduced, which reduces the wear on them. In addition, because the piston is stably guided by the skirts and the top skirt is close to the piston ring, radial loading on the piston ring is reduced so that it wears longer.

In another aspect, the guideway is made of cast-iron, a surface thereof against which the skirts slide is coated with a phosphate material, and the skirt is made of a composition of polytetrafluoroethylene, bronze and molybdenum. Preferably, the compression cylinder is also phosphate coated cast iron and the piston ring is a composition of polytetrafluoroethylene, bronze and molybdenum. The sliding surfaces of the cylinder and guideway are also preferably coated with a molybdenum disulfide film. This combination of sliding surfaces in an oilless design of the invention has been found to resist corrosion, wear very well and prolong the life of the pump.

Other features and advantages of the invention will be apparent from the drawings and the detailed description.

DETAILED DESCRIPTION OF THE PREFERRED EMBODIMENTS

Figure 1:
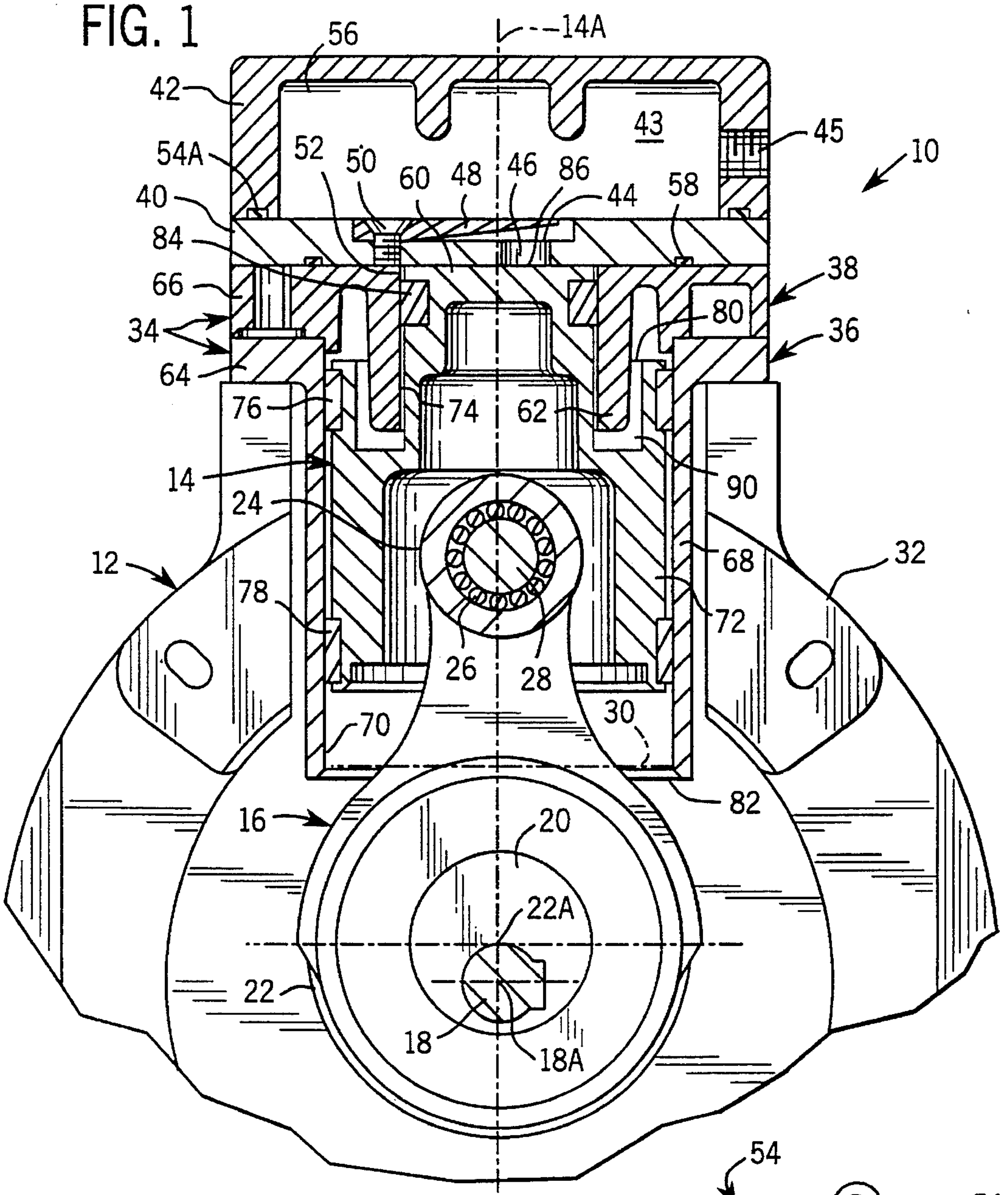
FIG. 1 is a fragmentary sectional view of a pump incorporating a cylinder and piston construction of the invention.

FIG. 1 illustrates a pump 10 of the invention, which may be operated as either a compressor or a vacuum pump. The pump 10 includes a housing 12, a piston 14, a connecting rod 16 and a drive shaft 18. In conventional fashion, drive shaft 18 is rotated about axis 18A by any suitable means, for example an electric motor (not shown), and is keyed or otherwise fixed to eccentric 20, which is journaled in crank end 22 of connecting rod 16. This drives center 22A of crank end 22 in an orbit around axis 18A.

Piston end 24 of connecting rod 16 is journaled by needle bearing 26 to wrist pin 28 whose opposed ends are fixed to piston 14. Since piston 14 is constrained to reciprocate along axis 14A in housing 12, the orbiting motion of crank end 22 is translated into reciprocating motion along axis 14A to drive the piston 14 reciprocally between the top dead center position shown in FIG. 1 and a bottom dead center position, indicated by line 30 which denotes the position of the bottom edge of the piston 14 at the bottom dead center position. The words "top" and "bottom" as used herein are without regard to the actual orientation of the pump 10, which may be in any orientation, but are defined with reference to the top and bottom dead center positions of the piston 14.

Housing 12 includes crank case 32, which forms the foundation of the pump 10 to which all of the other parts are directly or indirectly attached, cylinder 34 which is provided by guideway barrel 36 and compression chamber plate 38, valve plate 40 and head 42. As is well known, valve plate 40 and head 42 together define an intake passage and an exhaust passage 43. Only the exhaust passage 43 is illustrated in FIG. 1. In the exhaust passage 43, an exhaust reed valve 44 overlies exhaust port 46 formed in valve plate 40 and a valve stop 48 is fixed to plate 40 by screw 50 so as to limit the opening of the exhaust reed valve 44. As the piston 14 is extended from its bottom dead center position toward its top dead center position, gas admitted to the compression chamber 52 in which piston 14 reciprocates is compressed so that the pressure below reed valve 44 becomes greater than the pressure above reed valve 44. When that happens, reed valve 44 opens to allow the compressed gas to escape from the compression chamber 52 into exhaust passage 43 and out of the housing 12 through a pipe or hose (not shown) which would be threaded into connection port 45. At or near top dead center, reed valve 44 closes to prevent the gas which has been pumped out of the compression chamber 52 from re-entering the compression chamber 52 when the piston 14 begins retracting. After piston 14 begins retracting, an inlet reed valve (not shown), similar to exhaust reed valve 44 but reversed in orientation, opens to admit lower pressure gas from the intake passage into the compression chamber 52. The operation of intake and exhaust reed valves in reciprocating piston pumps is well known and need not be described in further detail here. Also, it should be understood that the invention may be practiced with any form of intake or exhaust valves.

Figure 2:
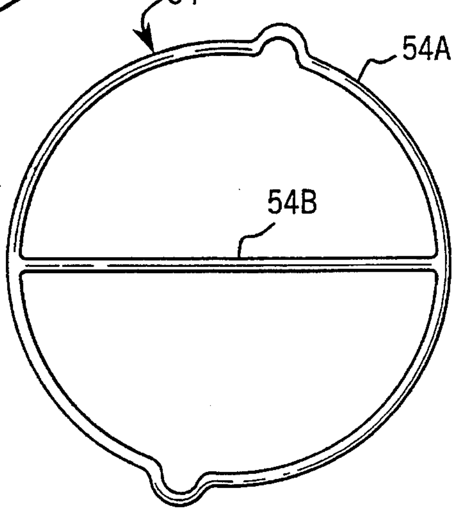
FIG. 2 is a plan view of an o-ring seal for the head of the pump of FIG. 1.

Head 42, valve plate 40, plate 38 and barrel 36 are secured to the crankcase 32 by any suitable means such as bolts or other threaded fasteners. An O-ring 54, shown in FIG. 2, establishes a seal between the head 42 and the valve plate 40 which prevents fluid communication between the intake and exhaust passages defined between the head 42 and valve plate 40. O-ring 54 preferably has a generally circular outer periphery 54A to seal the periphery of head 42 against valve plate 40 and has a leg 54B bisecting the outer periphery 54A and extending diametrically therebetween beneath wall 56 of head 42, which wall separates the intake passage (not shown) from the exhaust passage 43. A circular O-ring 58 seals the interface between valve plate 40 and compression chamber plate 38 around compression chamber 52, the boundaries of which are defined by piston head 60, cylinder sleeve 62 of plate 38, valve plate 40, and the intake and exhaust reed valves.

Pump 10 as illustrated is intended for the high pressure stage of a two stage pump for charging beer kegs with nitrogen gas. However, it should be understood that the invention is not limited to that application but could be applied to a single stage pump or to more of the stages of a multi-stage pump. Although the invention may be applied to any reciprocating piston type of pump for a compressible gas, it has particular application for higher pressure pumps, for example, 175 p.s.i.g., where the piston head is relatively small in diameter so that a larger diameter guideway and piston base can be provided around it.

Barrel 36 includes flange 64 for providing engagement between the flange 66 of plate 38 and the crank case 32 and also includes sleeve 68 which extends down into the crank case 32 co-axial with axis 14A and defines by its inner surface 70 a guideway for base 72 of piston 14. Barrel 36 is preferably made of cast-iron for structural rigidity and surface 70 is preferably coated with a fine grain manganese phosphate by a process in which the surface is exposed to a dilute solution of phosphoric acid so that the surface reacting chemically with the phosphoric acid is converted to have an integral, mildly protective layer of insoluble crystalline phosphate, which process is well known in the art, to a thickness of preferably 0.0003 to 0.0005 inches thick. Following that coating process, surface 70 is preferably coated with a dry film of molybdenum disulfide to a thickness of 0.001 inches thick. This is preferably performed in two coats of 0.005 inches thick, each of which is cured at 400° F. A suitable molybdenum disulfide dry film coating is commercially available from Sandstrom Products Co. of Port Byron, Ill. as Sandstrom 9A Dry Film.

These same coatings are also preferably applied to inner surface 74 of cylinder sleeve 62, and the plate 38 (which includes sleeve 62) is also preferably made of cast-iron.

Piston skirts 76 and 78 preferably surround base 72 with the skirt 76 adjacent to a top end 80 of base 72 and the skirt 78 adjacent to bottom end 82 of base 72. Each skirt 76 and 78, when unwrapped from base 72 and laid flat, is in the form shown in FIG. 3. As such, each skirt has opposed ends A and C which are offset from one another with a central portion B extending between the ends A and C. When wrapped around base 72, end A fits into the space adjacent to end C and end C fits into the space adjacent to end A. The skirts 76 and 78 are received in grooves of a similar width in the outer surface of base 72 so that when the base 72 with skirts 76 and 78 wrapped around it are inserted into the sleeve 68, the sleeve 68 holds them in the grooves so that they are axially constrained relative to the base 72.

Figure 3:
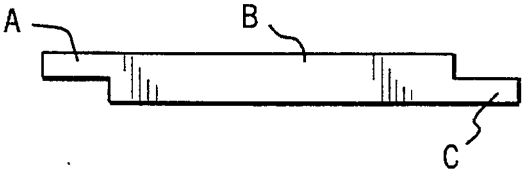
FIG. 3 is a plan view of a skirt seal or ring for the piston of the pump of FIG. 1.

A ring 84 also surrounds piston head 60 near the top end 86 thereof and is in the form shown in FIG. 3, having circumferentially overlapping ends A and C with a central portion B extending between them. However, ring 84 differs from skirts 76 and 78 in that it not only provides a sliding bearing surface like the skirts 76 and 78 do, but it also provides a sliding seal against cylindrical surface 74 of compression chamber 52 as the piston 14 is reciprocated. No such sealing is required of the skirts 76 and 78 since they do not border a compression or vacuum chamber like the ring 84 does.

The skirts 76 and 78 and ring 84 are preferably made of a material which is compatible with the material of the coated surfaces 70 and 74, which they slide against, as well as with the material of the piston 14, which is preferably aluminum. This material must be lubricious against the surfaces 70 and 74 so as to reduce friction and last over a long life of the surfaces, for example 6,000–10,000 hours of operating time, and in the case of the ring 84 must continue to provide a seal over this period. A composition of 45% bronze, 2–3% molybdenum (3% typical) and the remainder polytetrafluoroethylene produces the desired results, and therefore this material is preferred for the skirts 76 and 78 and ring 84, in combination with the coatings of the surfaces 70 and 74 previously described.

Cylinder sleeve 62 extends downwardly into axially facing annular cavity 90 which is formed in the top end 80 of base 72 when the piston 14 is at its top dead center position. This extension of the cylinder sleeve 62 keeps the piston ring 84 from becoming unseated out of the sleeve 62 while still allowing skirt 76 to be located axially quite close to the ring 84 and to the top end 86 of head 60.

Locating skirt 76 close to the ring 84 and top end 86 is desirable because it has the advantage of reducing wear between the ring 84 and the sleeve 62. This may be understood, for example, by considering a case in which the center of the top skirt 76 is slightly offset from the center of the bottom skirt 78 relative to an ideal axis. If a line is drawn between the two centers, the line is at an angle to the ideal axis and the radial error from the ideal axis becomes greater as the line is projected. By positioning the top skirt relatively close axially to the piston ring, the error at the axial position of the piston ring is kept correspondingly small, thereby reducing the radial loading on the piston ring, and therefore the rate at which the ring wears.

In this regard, it is also desirable to position the skirt 78 adjacent to the bottom end 82. Spacing the skirts 76 and 78 as far apart as practical reduces the angle of the projected line relative to the ideal axis, which reduces the radial error from the ideal axis at a given axial position. A wider spacing between the skirts 76 and 78 also results in more stability in guiding the piston 14 and lower radial forces on the skirts since a wider spacing increases the ability of the skirts to resist moment forces to which the piston is subjected as it is reciprocated.

It should be noted that the skirts 76 and 78 do most of the guiding of the piston 14, although the piston ring 84 also does some guiding of the piston 14 as it wipes against the cylinder surface 74. The skirts 76 and 78 do most of the guiding of the piston 14 because of their axial spacing and because each presents a larger bearing surface than the ring 84, each skirt 76 and 78 being larger in diameter and width than the ring 84. In addition, since the skirts 76 and 78 and ring 84 are made of a relatively soft material, because the skirts 76 and 78 are thinner in cross-section than the ring 84, the skirts are less compressible in the radial direction than the ring 84 so that they do most of the guiding and the ring 84 largely conforms against surface 74 as it is guided by the skirts 76 and 78.

Preferred embodiments of the invention have been described in considerable detail. Many modifications and variations to the embodiments described and illustrated will be apparent to those skilled in the art. Therefore, the invention should not be limited to the inventions described and illustrated, but should be defined by the claims which follow.

We claim:

1. In an oiless compressor or vacuum pump having a housing which defines a compression chamber and a cylindrical guideway co-axial with the compression chamber, and having a pistons which is reciprocable in said housing, said piston having a head which is received in said compression chamber to compress a gas therein when said piston is reciprocated and a cylindrical base received in said guideway to guide said head as said piston is reciprocated, the improvement wherein:

said compression chamber is defined by a cylinder sleeve in which said head of said piston reciprocates, said cylinder sleeve having a bottom end which extends axially into said guideway;

said base of said piston has a top surface facing said cylinder sleeve, said top surface defining an axially facing cavity radially inward of a top end of said base of said piston, said sleeve extending into said cavity when said piston is at a top dead center position; and said head is rigidly connected to said base.

2. The improvement of claim 1, wherein a skirt is provided on said base adjacent to said top end of said base, said skirt sliding against said guideway.

3. The improvement of claim 1, wherein a ring is provided around a top-end of said piston head which forms a sliding seal against a surface of a wall of said compression chamber, said wall being made of cast-iron, said surface being coated with a phosphate material and said ring being made of a composition including polytetrafluoroethylene, bronze and molybdenum.

4. The improvement of claim 3, wherein skirts of the same material as said ring are provided on said base for sliding against said guideway and said guideway is made of phosphate coated cast-iron.

5. The improvement of claim 4, wherein said material of said ring and skirts is approximately 45% bronze, 2–3% molybdenum and substantially the remainder is polytetrafluoroethylene.

6. The improvement of claim 5, wherein said guideway is coated with a molybdenum disulfide film.

7. The improvement of claim 1, wherein said compression chamber, said guideway, said piston head, and said piston base are cylindrical.

8. The improvement of claim 7, wherein said cavity is annular.

9. In an oiless compressor or vacuum pump having a housing which defines a compression chamber and a cylindrical guideway co-axial with the compression chamber, and having a piston which is reciprocable in said housing, said piston having a head which is received in said compression chamber to compress a gas therein when said piston is reciprocated and a cylindrical base received in said guideway to guide said head as said piston is reciprocated, the improvement wherein:

said compression chamber is defined by a cylinder sleeve in which said head of said piston reciprocates, said cylinder sleeve having a bottom end which extends axially into said guideway; and said base of said piston has a top surface facing said cylinder sleeve, said top surface defining an axially facing cavity radially inward of a top end of said base of said piston, said sleeve extending into said cavity when said piston is at a top dead center position;

wherein a skirt is provided on said base adjacent to said top end of said base, said skirt sliding against said guideway;

wherein said top-end skirt is secured in an axial position on said base which overlaps said piston head axially and said axially facing cavity is at an axial position which is radially between said top-end skirt and said piston head; and a second skirt is provided on said base adjacent to a bottom-end thereof and spaced apart from said top-end skirt, said skirt sliding against said guideway.

10. The improvement of claim 2, wherein said guideway is made of cast-iron and a surface thereof against which said skirt slides is coated with a phosphate material, and said skirt is made of a composition of polytetrafluoroethylene, bronze and molybdenum.

11. The improvement of claim 10, wherein said skirt is approximately 45% bronze, 2–3% molybdenum and the remainder is polytetrafluoroethylene.

12. The improvement of claim 2; wherein a second skirt is provided on said base adjacent to a bottom-end thereof, said skirt sliding against said guideway.

13. The improvement of claim 12, wherein said guideways made of cast-iron and a surface thereof against which said skirts slide is coated with a phosphate material, and said skirts are made of a composition of polytetrafluoroethylene, bronze and molybdenum.

14. The improvement of claim 15, wherein said composition of said skirts is approximately 45% bronze, 2–3% molybdenum and substantially the remainder is polytetrafluoroethylene.

15. In an oiless compressor or vacuum pump having a housing which defines a compression chamber and a cylindrical guideway co-axial with the compression chamber, and having a piston which is reciprocable in said housing, said piston having a head which is received in said compression chamber to compress a gas therein when said piston is reciprocated and a cylindrical base received in said guideway to guide said head as said piston is reciprocated, the improvement wherein:

said compression chamber is defined by a cylinder sleeve in which said head of said piston reciprocates, said cylinder sleeve having a bottom end which extends axially into said guideway;

said base of said piston has a top surface facing said cylinder sleeve, said top surface defining an axially facing cavity radially inward of a top end of said base of said piston, said sleeve extending into said cavity when said piston is at a top dead center position; and said head is of a diameter which is slightly smaller than said cylinder sleeve so as to be slidably received in said cylinder sleeve and said diameter extends into said cavity.

16. The improvement of claim 15, wherein said head is rigidly connected to said base.

* * * * *

UNITED STATES PATENT AND TRADEMARK OFFICE

CERTIFICATE OF CORRECTION

Patent No. : 5,493,953

Dated : February 27, 1996

Inventors : John H. Bolthouse, et al.

It is certified that error appears in the above-identified patent and that said Letters Patent is hereby corrected as shown below:

Col. 5, line 54 (claim 1) change "pistons" to --piston--.

Col. 7, line 6 (claim 14) change "claim 15" to --claim 13--.

Signed and Sealed this

Nineteenth Day of November, 1996

*Attest:*

BRUCE LEHMAN

*Attesting Officer*

*Commissioner of Patents and Trademarks*